United States Patent [19]
Hoffert

[11] 3,864,465
[45] Feb. 4, 1975

[54] PRODUCTION OF HIGH PURITY HYDROGEN

[75] Inventor: Franklin D. Hoffert, Mountainside, N.J.

[73] Assignee: Hydrocarbon Research, Inc., New York, N.Y.

[22] Filed: Dec. 15, 1972

[21] Appl. No.: 315,418

[52] U.S. Cl............... 423/648, 423/651, 423/656, 423/658, 75/34
[51] Int. Cl......... C01b 1/26, C01b 1/28, C01b 1/32
[58] Field of Search ........... 423/656, 658, 648, 651; 55/23, 48; 75/34

[56] References Cited
UNITED STATES PATENTS

| | | |
|---|---|---|
| 1,375,932 | 4/1921 | Rideal............................. 423/656 X |
| 2,182,747 | 12/1939 | Marshall, Jr........................ 423/658 |
| 2,449,635 | 9/1948 | Barr................................. 423/658 |
| 3,011,589 | 12/1961 | Meyer................................. 55/23 |
| 3,187,485 | 6/1965 | Konz.................................. 55/48 |
| 3,361,535 | 1/1968 | Pollitzer........................... 423/651 |
| 3,420,633 | 1/1969 | Lee............................... 423/648 X |
| 3,442,619 | 5/1969 | Huebler et al...................... 423/658 |
| 3,442,620 | 5/1969 | Huebler et al...................... 423/658 |
| 3,619,142 | 11/1971 | Johnson et al..................... 423/658 |

Primary Examiner—Edward Stern

[57] ABSTRACT

Hydrogen of a purity of at least 90% is obtained from a cryogenic unit. The impure hydrogen is pretreated for removal or conversion of the impurities in a bed of fluidized iron oxides.

3 Claims, 1 Drawing Figure

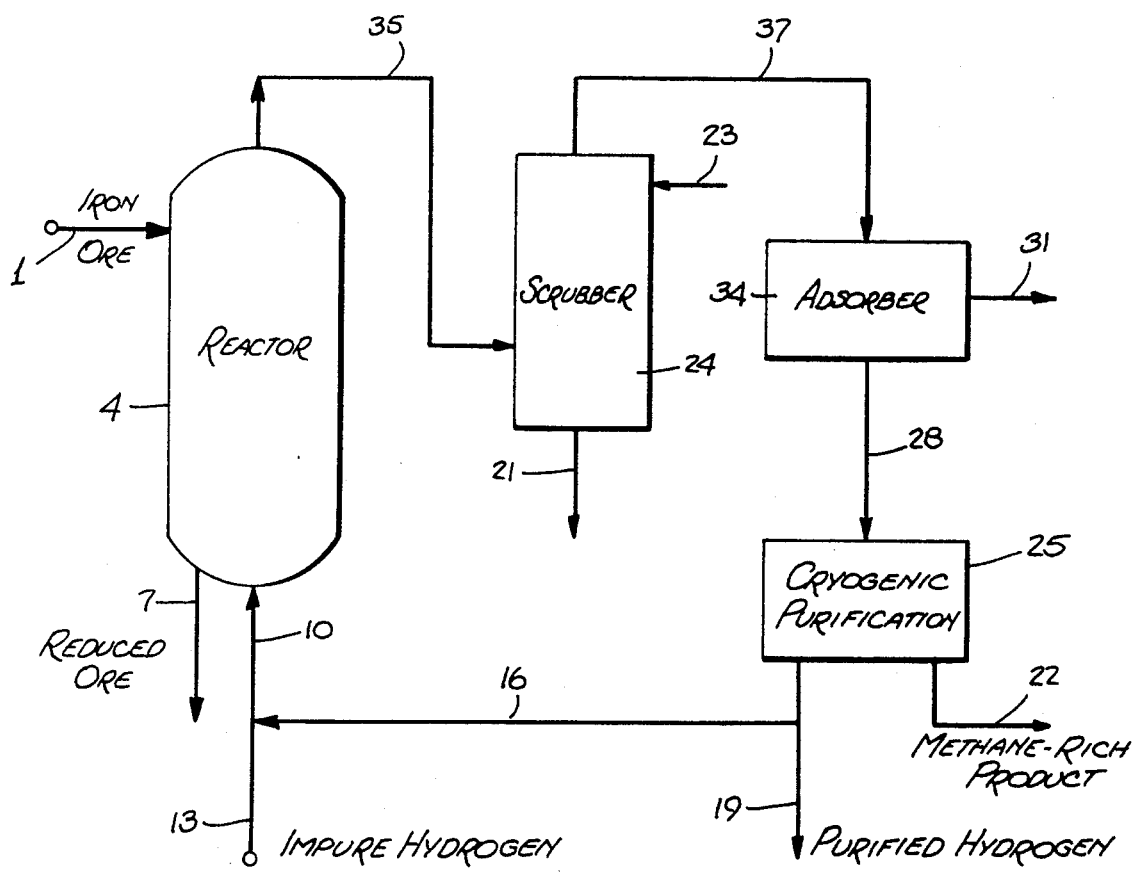

PRODUCTION OF HIGH PURITY HYDROGEN

BACKGROUND

Impure hydrogen streams are readily available from the off-gas of a petroleum refinery, steel mill, petrochemical operations and the like. Such off-gases contain trace amounts, up to several percent, of impurities which often impose difficult problems when attempts are made to upgrade the gas to produce a more pure hydrogen. The principal impurities to be found in manufactured hydrogen are carbon dioxide, carbon monoxide, oxygen, water vapor and trace impurities can be acetylene, hydrogen sulfide, methane and tar fog or mists. As a consequence, the impure hydrogen must be scrubbed, seived, chilled, heated, filtered, distilled, etc., in order to remove the impurities. There are also some off-gases that are extremely difficult to upgrade as a result of selective impurities that can't be handled by orthodox methods. U.S. Pat. No. 3,187,485 uses nitrogen to scrub the impure hydrogen while U.S. Pat. No. 3,011,589 uses caustic scrubbing combined with cryogenic separation and molecular sieves. In U.S. Pat. No. 2,998,303, the impure hydrogen is heated with steam and passes through a catalyst bed of ruthenium and rhodium while in U.S. Pat. No. 2,747,970 the hydrogen is passed over a ruthenium or rhodium for removal of carbon monoxide at atmospheric pressure. The expense of these multiple step purification systems or the especially prepared catalysts do not make these purification processes desirable for purifying the off-gas hydrogen which is generally recycled for use in the plant producing the off-gas.

SUMMARY OF INVENTION

It has been discovered that impure hydrogen off-gas can be simply and economically purified to at least 90% hydrogen after methane removal through contact with a bed of iron ore under temperatures between 600°F and 1100°F and pressures between 100 psi and 1000 psi. The carbon monoxide and carbon dioxide impurities are essentially converted to methane. Tar fog impurities are coked. Some ammonia is synthesized from the nitrogen impurities. Solid impurities will be captured in the iron ore bed. Dangerous impurities such as acetylene will be hydrogenated. Any heavy hydrocarbon impurities will crack in passing through the iron ore bed. The hydrogen-containing treated gases from the iron ore bed are then passed through a cryogenic separator which now easily removes the impurities mostly methane to produce the purified hydrogen.

This purification system provides a distinct advantage in that the catalyst is easily obtained. Rather than having to have the expensive ruthenium or rhodium catalyst especially created, this method autogeneously produces the catalyst from the iron ore. As the impure hydrogen passes through the iron ore, the iron oxides are reduced to the iron metal which acts as the catalyst for converting the impurities which can easily be removed in the cryogenic separator. A second benefit of this purification system is that the raw iron ore is converted into the more valuable iron metal.

DESCRIPTION OF DRAWING

The drawing shows an embodiment of the principal elements of a hydrogen purification system for treatment of off-gas hydrogen in an iron ore bed.

DESCRIPTION OF THE PREFERRED EMBODIMENT

In accordance with this invention, a preferred embodiment will be described for the purification of a hydrogen-containing off-gas through the use of an iron ore catalyst bed.

Iron ore in line 1 is fed to the bed 4. Bed 4 may be a multiple bed as well as a single bed reactor. The off-gas containing the impure hydrogen in line 13 is fed to the reactor 4 through line 10. The off-gas preferentially passes upwardly through the iron ore which preferentially is passed counter-current to the off-gas in 4. Reactor 4 is operated at a pressure between 100 psi and 1000 psi but preferentially at a pressure between 500 psi and 600 psi. The temperature in reactor 4 is between 600°F and 1100°F but preferentially it is between 700° and 900°F. The off-gas in 13 is fed at such a rate that the superficial fluid bed velocity is preferentially between 0.25 and 1.5 feet per second. If the hydrogen content of the off-gas is below 30% it is preferred to recycle purified hydrogen through line 16 to combine with the off-gas from 13 in line 10. This permits the reduction of the iron ore to proceed at a rate sufficient to maintain the hydrogenation of the impurities in the hydrogen.

As the iron ore, in reactor 4, is reduced from the oxide form to the metal the catalyst, for the hydrogenation of the impurities in the hydrogen, is autogeneously being generated. The pressure in the reactor is significant. The pressure at which oxide reduction occurs is also high enough so as to promote and accelerate the methanation of carbon oxide impurities, this reaction equilibrium being favored by pressure. The impurities to be found in a typical off-gas hydrogen suitable for purification by this method and their reaction in the presence of the catalyst are shown in Table I.

TABLE I

TYPICAL HYDROGEN-CONTAINING OFF-GAS

| Component | Percent Composition | Reaction in the Presence of Iron Oxides and Iron Metal |
|---|---|---|
| $H_2$ | 75 | Will reduce iron oxides and hydrogenate impurities. |
| $N_2$ | 4 | Will form some $NH_3$* |
| $O_2$ | 0.2 | Consumed totally forming $H_2O$ |
| Argon | 1 | Unchanged |
| CO | 2 | Methanated or shifted |
| $CO_2$ | 0.5 | Methanated or shifted |
| $C_2H_2$ | 0.5 | Forms ethylene/ethane |
| $NH_3$ | 0.3 | Removed in water-wash tower |
| Tar | 0.1 | Forms coke + $H_2$ |
| $CH_4$ | 13 | No change |
| $C_2H_4$ | 2.4 | Hydrogenated to ethane |
| $C_2H_6$ | | Unchanged |
| $C_3H_8$ | 1 | Cracked to methane and ethylene. |
| | 100.0 | |

*Dependent upon chemical equilibrium quantity.

The water vapor that is present has an effect on whether the carbon monoxide and carbon dioxide are methanated or whether the carbon monoxide is shifted to carbon dioxide. Iron is active as a shift and methanation catalyst. It is therefore the dryness of the gas which promotes the kinetics of the methanation reaction over the shift reaction. Since the reactor is operated at such high pressures the ambient temperature hydrogen-containing off-gas is inherently dry and, therefore, the methanation reaction is promoted.

The impure hydrogen containing the reacted impurities leaves reactor 4 through line 35 and passes through scrubber 24 with water added at 23 and water containing dust and condensed water vapor is removed at 21. The overhead from 24 passes through 37 to adsorber 34 for preliminary removal of trace impurities that can be removed by adsorption in line 31, such as $H_2O$, $H_2S$, and $CO_2$.

The methane-rich hydrogen passes in line 28 to the cryogenic purification unit 25 wherein a methane-rich stream is removed in line 22 and a hydrogen product of at least 90% purity is removed in 19.

Those skilled in the art will visualize many modifications and variations to this invention without departing from the scope and spirit thereof. Accordingly, the claims should not be interpreted in any restrictive sense other than that imposed by the limitations recited within the claims.

I claim:

1. A process for the purification of an impure hydrogen stream having a hydrogen content of below 90% and containing impurities including one or more members selected from the group consisting of carbon dioxide, carbon monoxide, oxygen, nitrogen, water vapor, hydrogen sulfide and hydrocarbon substances which comprises:
   a. feeding said impure hydrogen stream through a fluidized bed of iron ore wherein said bed is maintained at a pressure between 100 and 1000 psi and at a temperature between 600° and 1100°F whereby impurities in the hydrogen are converted and iron oxide present in the iron ore is reduced to iron metal;
   b. removing said hydrogen stream and said converted impurities from said bed;
   c. separating said converted impurities from said hydrogen;
   d. removing a purified hydrogen product stream containing at least 90 percent hydrogen.

2. The process of claim 1 wherein said bed is maintained at a temperature between 700° and 900°F and at a pressure between 500 and 600 psi.

3. The process of claim 1 wherein the separation in step (c) comprises the steps of scrubbing, adsorption and cryogenic separation.

* * * * *